US006230171B1

(12) United States Patent
Pacifici et al.

(10) Patent No.: US 6,230,171 B1
(45) Date of Patent: May 8, 2001

(54) MARKUP SYSTEM FOR SHARED HTML DOCUMENTS

(75) Inventors: Giovanni Pacifici, New York, NY (US); Alaa Youssef, Norfolk, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,926

(22) Filed: Aug. 29, 1998

(51) Int. Cl.$^7$ ..................................... G06F 17/21
(52) U.S. Cl. .................... 707/512; 707/501; 345/330; 709/204
(58) Field of Search ...................... 707/501, 512, 707/513; 345/329, 330, 331, 332; 709/203–205, 218

(56) References Cited

U.S. PATENT DOCUMENTS

| | | | | |
|---|---|---|---|---|
| 5,802,530 | * | 9/1998 | Van Hoff | 707/513 |
| 5,844,553 | * | 12/1998 | Hao et al. | 345/329 |
| 5,944,791 | * | 8/1999 | Scherpbier | 709/218 |
| 5,949,412 | * | 9/1999 | Huntsman | 345/329 |
| 6,047,314 | * | 4/2000 | Pommier et al. | 709/205 |

OTHER PUBLICATIONS

Bantley et al, "Supporting Collaborative Information Sharing with the World Wide Web: The BSCW Shared Workspace System", 12 pages, <http://orgwis.gmd.de/~bscw/papers/boston–95/BOSTON/html>, Oct. 1995.*

Joerg, "web Book–Integrating content organization, presentation and services", 20 pages, <http:www.ee.ualberta.ca/~webbook/paper/NAWeb97.htm>, Aug. 1997.*

Schickler et al, "Pan–Prowser Support for Annotations and Other Meta–Information on the World Wide Web", 17 pages, <http:brahma.imag.fr/Multimedia/www5cd/www418/overview.htm>, Aug. 1996.*

Woo et al, "A Synchronous Collaboration Tool for World–Wide Web", 11 pages, <http:ww/ncsa.uiuc.edu/SDG/IT97/Proceedings/CSCW/rees/SynColTol.html>, Oct. 1994.*

Davis et al, "Shared Annotation for Cooperative Learning", 7 pages, <http://www.ceca.indiana.edu.cscI95/davis.html, Sep. 1995.*

Roscheisen et al, "Beyond Browsing: Shared Comments, SOAPs, Trails, and On–line Communities", 16 pages, <http://www.igd/fhg.de/archive/1995_www95/papers/88/TR/WWW95.html>, Oct. 1995.*

Jesshope, Chris; et al. "Low–bandwidth multimedia tools for Web–based lecture publishing." Engineering Science and Education Journal, vol. 7, issue 4, Aug. 1998. IEEE. ©1998. pp. 148–154.*

Allum, Matthew. "Cross–Browser Cursor Trails." Inside Dynamic HTML Update! Saturday, May 9, 1998. InsidedDHTML.com, LLC. ©1998.*

Girgensohn, Andeas, and Alison Lee. "Developing collaborative applications on the World Wide Web." Proceedings of the CHI 98 Summary Conference on Human Factors and Computing Systems (held Apr. 18–23, 1998). ACM. ©1998. pp. 141–142.*

(List continued on next page.)

Primary Examiner—Joseph H. Feild
(74) Attorney, Agent, or Firm—Scully, Scott, Murphy & Presser; Douglas Cameron, Esq.

(57) ABSTRACT

A shared markup system and a method are provided for supporting Web co-browsing. Based on the hyper-text markup language (HTML), the markup system is interoperable across different platforms and Web browsers and provides for online annotation, of shared HTML documents, directly within the browser's windows. The annotations created by the markup system are realized using HTML components that are composed dynamically. Synchronization and control of the browser's environment are also provided to achieve uniform participants' views.

38 Claims, 6 Drawing Sheets

Arrangement of markup components in virtual planes

OTHER PUBLICATIONS

Marais, Hannes, and Krishna Bharat. "Supporting cooperative and personal surfing with a desktop assistant." Proceedings of the 10th Annual ACM Symposium on User Interface Software and Technology (held Oct. 14–17, 1997). ACM. ©1997. pp. 129–138.*

Greenberg, Saul, Mark Roseman. "GroupWeb: A WWW Browser as Real Time Groupware." Proceedings of the CHI '96 Conference Companion on Human Factors in Computing Systems: Common Ground (conference held Apr. 13–18, 1996. ACM, Inc. ©1996. pp. 271–272.*

Roseman, Mark, and Saul Greenberg. "Building Real–Time Groupware with GroupKit, a Groupware ToolKit." ACM Transactions on Computer–Human Interaction, vol. 3, Issue 1. ©1996. pp. 66–106.*

Flanagan, David. JavaScript: The Definitive Guide, 2nd ed. O'Reilly and Associates. ©1997. Section 11.3, "Windows and Frames.".*

Foley, James D., et al. Computer Graphics: Principles and Practice (2nd edition in C). Addison–Wesley Publishing Company. ISBN 0–201–84840–6. ©1996. pp. 360–361, 511, 1073, 1060–1065.*

Röscheisen, Martin, and Christian Mogensen. "Interaction Design for Shared World–Wide Web Annotations." Conference Companion on Human Factors in Computing Systems (held May 7–11, 1995. ACM. ©1995. pp. 328–329.*

* cited by examiner

Interactions among markup system, client-side manager and web browser

Markup system components

```
//Find Frame name (canonical name of the form: top.frames[n].frames[m]...)
var found = 0;
var FullName = "";
function DFS ( f, n )
{
  var newf, newn;
  if ( this == eval ( f ) ) {
    found = 1;
    FullName = f;
    return;
  }
  for ( var i = 0 ; i < n && found == 0 ; i++ ) {
    newf = f + ".frames[" + i + "]";
    newn = eval ( newf + ".length" );
    DFS ( newf, newn );
  }
} function getFullName ()
{
  var f = "top";
  var n = top.length;  //length of the frames array
  DFS ( f, n );        //recursively identify the full name of the frame
  if ( found == 0 ) { //should not happen
    alert ( "Error finding frame name !!" );
  }
}
```

A recursive JavaScript routine for the unique identification of a frame

```
/* Begin style sheet */
HTML { /* Set the document defaults. Most tags inherit from the < HTML > tag */
    font-family: serif,sans-serif;
    font-size: 15px;
    margin: 0 5 0 5;
    padding: 0;
    border-width: 0;
}
H1 { font-size: 30px } /* Override the defaults set above */
H2 { font-size: 22px }
H3 { font-size: 18px }
H4 { font-size: 15px }
H5 { font-size: 12px }
H6 { font-size: 12px }
TD, TH {/* Tables do not inherit */
    font-family: serif,sans-serif;
    font-size: 15px;
}
PRE, CODE, TT, KBD, SAMP { /* These require a different typeface */
    font-family: monospace;
    font-size: 15px;
}
/* End of style sheet */
```

A sample style sheet for synchronization of views

MARKUP SYSTEM FOR SHARED HTML DOCUMENTS

DESCRIPTION

1. Technical Field

The present invention generally relates to information processing, and particularly is directed to dynamic hypertext markup language (HTML) collaborative document processing.

2. Prior Art

The traditional peer-to-peer multi-party collaboration systems allow several participants to join a conference group to share documents while communicating over an audio and sometimes video network infrastructure. Additionally, with growing popularity of the World Wide Web (Web), several Web-based multimedia collaboration systems have been recently introduced, in which the participants join in a conference and navigate the Internet to explore its resources together. The Web-based multimedia collaboration systems are often based on a client/server model, having client applications frequently implemented in Java™ and downloaded dynamically during the initial set-up phase.

A key feature of multi-party collaboration systems is the markup of shared documents. Markups allow presenters to bring the attention of other participants to specific portions of the shared material, using pointer, annotations and highlights. In order for the traditional peer-to-peer multi-party collaboration systems to support interoperability among various collaborative applications, the traditional systems must rely on complex standards such as the T.120 series developed by the International Telecommunications Union (ITU). Examples of such traditional peer-to-peer multi-party collaboration systems are Microsoft's NetMeeting™ and Whiteboard™ ("wb"), the application which is part of the MBONE suite of conferencing tools.

Compared to the traditional peer-to-peer multi-party collaboration systems, the Web-based collaboration systems offer a much higher degree of interoperability, since virtually every desktop system is Web-enabled and client applications are downloaded as part of the service establishment phase. However, while markup functionalities are easily achieved in traditional peer-to-peer collaboration systems, their implementation becomes more problematic for Web-based collaboration systems. The problem stems from the difficulty of creating a platform independent application capable of directly writing and marking over the HTML document displayed in the Web browser's window.

The current Web-based collaboration systems are limited in that they only offer markup functionalities by means of shared whiteboards, i.e., applications that control a separate (blank) window over which users can write and draw. Examples of such systems are IBM's WebCollab system and NIST's Java Collaborative environment. Therefore, it is highly desirable to provide a cross-platform system capable of directly annotating HTML documents displayed within the browser's window while at the same time allowing each participant to view the same HTML document with the annotations as the document is being annotated.

Web-based collaboration systems allow users to create and join conference groups by accessing a given URL using a Web browser. A client application, written in Java® and dynamically downloaded during the set-up phase, allows participants of a conference group to synchronously share HTML documents.

A conference moderator (or floor holder) selects a desired HTML document (or Web page) and the Web-based collaboration system distributes the document to all other participants of the same conference group.

Depending on the particular implementation, the document content or its reference is distributed. Some of the Web-based collaboration systems also provide a shared audio channel.

FIG. 1 illustrates an architecture for a Web-based collaboration system. The system includes the Web servers 110, the collaboration server 112, the client-side managers 114, and the Web browsers 116. At each participant's workstation 118, the Web browser 116 acts as the display as well as the interaction environment for the user. The client-side manager 114 is responsible for directing the Web browser 116 to display the current shared document as well as collecting user inputs such as conference join and document display actions. User inputs are transferred to the collaboration server 112 as client-side manager requests. Typically, a client-side manager 114 is implemented as a front-end Java® applet.

The collaboration server 112 is responsible for collecting and verifying requests from client-side managers 114. Examples of requests are: create a new conference group, join a conference group, requesting a conference group floor or selecting a new document for display. Collaboration servers 112 may be either centralized or distributed. In the case of a distributed collaboration server its functionalities are incorporated inside the client-side managers 114, while in the case of a centralized one the functionalities are located in a separate process (as shown in FIG. 1).

Collaboration servers may also employ different types of mechanism for broadcasting a document to conference group participants. For example, in a client pull model, the collaboration server 112 delivers to the client-side managers 114 the names of the URL which contain the document to broadcast. Each of the client-side managers 114 then will access and retrieve the URL to be displayed in the associated browser's window. An alternative approach is based on a server push model. In this approach, the collaboration server 112 retrieves the requested document directly from the Web server 110, and broadcasts the document with its components to the client-side managers connected to the conference. In this case, the client-side managers 114, buffer the document and its components locally and instruct the browsers 116 to display the document. An advantage of the server push model is that only one request is issued to the Web server on behalf of all the conference participants, thus reducing the Web server load. Another advantage of this approach is that the retrieved document may be modified by the collaboration server before being broadcasted to the conference participants as a shared document. In this fashion, whenever the moderator selects one of the hyperlinks inside the displayed document, the request will be redirected to the collaboration server which will handle broadcasting the new document to all participants. On the other hand, an advantage of a client pull model is the reduced complexity of both client-side managers and collaboration server.

SUMMARY OF THE INVENTION

To resolve the above shortcomings of the existing Web collaboration systems, it is one object of the present invention to provide a platform-independent markup system capable of directly annotating HTML documents displayed inside the browser's window and operable across various platforms as well as vendor-specific Web browsers.

It is another object of the present invention to have the annotations themselves be HTML components that are dynamically added to the document.

Different layouts of various HTML contents among the participants of a collaboration session can produce undesired markup effects. For example, when the participants utilize computer platforms having different screen resolutions, window sizes or font sizes, from other participants, a mark surrounding one segment of the document displayed in one participant's browser can appear as a mark surrounding a different segment of the same document as displayed by another participant's browser. Accordingly, it is a further object of the present invention to provide a mechanism for synchronizing the views of the participants by controlling the browsers' environments. The present invention is directed to a platform independent, markup system for shared HTML documents. The distinctive feature of this markup system is that it is HTML-based: it allows for annotating active HTML pages inside the browser's windows; and the annotations themselves are HTML components that are dynamically added to the document. Being HTML-based and running within Web-browsers lends the new shared markup system to interoperability across various platforms and Web browsers in a natural way.

The present system employs new advances in Web technology in order to realize the desired markup functions. It combines the powers of dynamic HTML, Cascading Style Sheets, absolute positioning of HTML components, as well as the powers of client-side scripting languages, in order to realize the different whiteboard functionalities.

Mechanisms for synchronizing the views, of the participants of a Web co-browsing session, to a unified consistent view of the shared HTML document are also utilized for the correct realization of the markup functions. Two approaches for synchronization are presented: the hard synchronization approach which implements a complete What You See Is What I See (WYSIWIS) environment, and the flexible synchronization approach, which gives more freedom to the participants in deciding on the visible portions of the shared document in their browsers, while keeping a consistent layout for the document and markup HTML components.

For correct functioning of the markup system within a Web co-browsing system, a collaboration server for associating a markup agent with each loaded HTML page, and for accommodating late comers, is integrated with the markup system. Also, a method for uniquely identifying a frame within the browser's window is utilized to achieve correct visualization.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIG. 5 illustrates a recursive JavaScript routine for identifying a unique frame within a browser window; and FIG. 6 is a sample style sheet utilized for synchronization of views among the participants.

DETAILED DESCRIPTION OF THE PREFERRED EMBODIMENT OF THE INVENTION

The present invention is directed to a markup system capable of directly annotating HTML documents displayed inside the browser's window of a Web-based collaboration system. The markup system is implemented as a JavaScript component inside the shared HTML document. In the preferred embodiment of the present invention, the collaboration server 112 modifies the retrieved document to insert the JavaScript-based markup component.

A novel feature of the markup system is the capability of directly marking (or annotating) the shared document displayed inside the browser's window. The direct annotations are accomplished by having the markups themselves be HTML components that are dynamically added to the document. In the preferred embodiment, the dynamic HTML components are added by a process running inside the browser's virtual machine written using the JavaScript scripting language.

Figure 1:
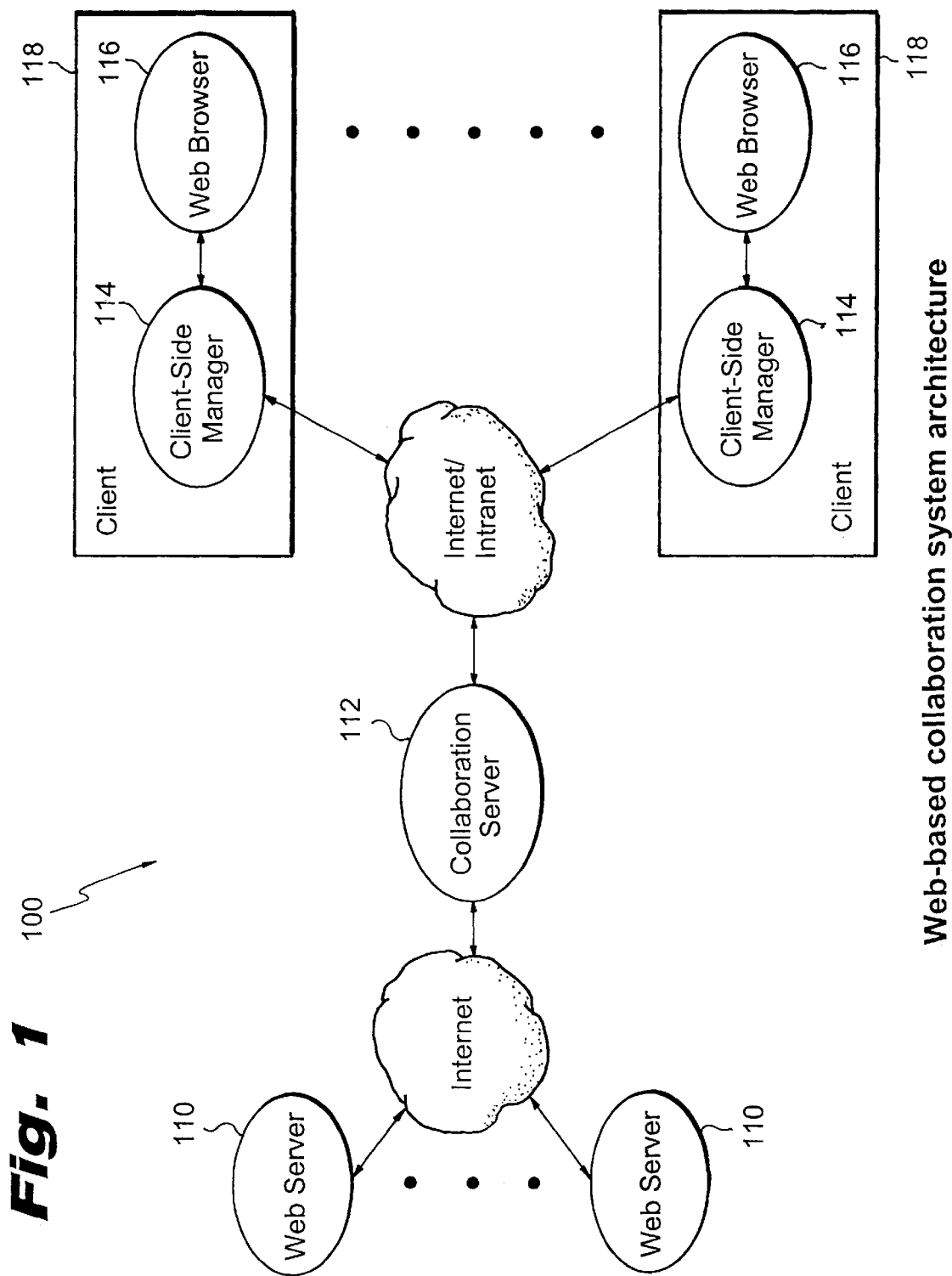
FIG. 1 illustrates Web-based collaboration system architecture.
Figure 2:
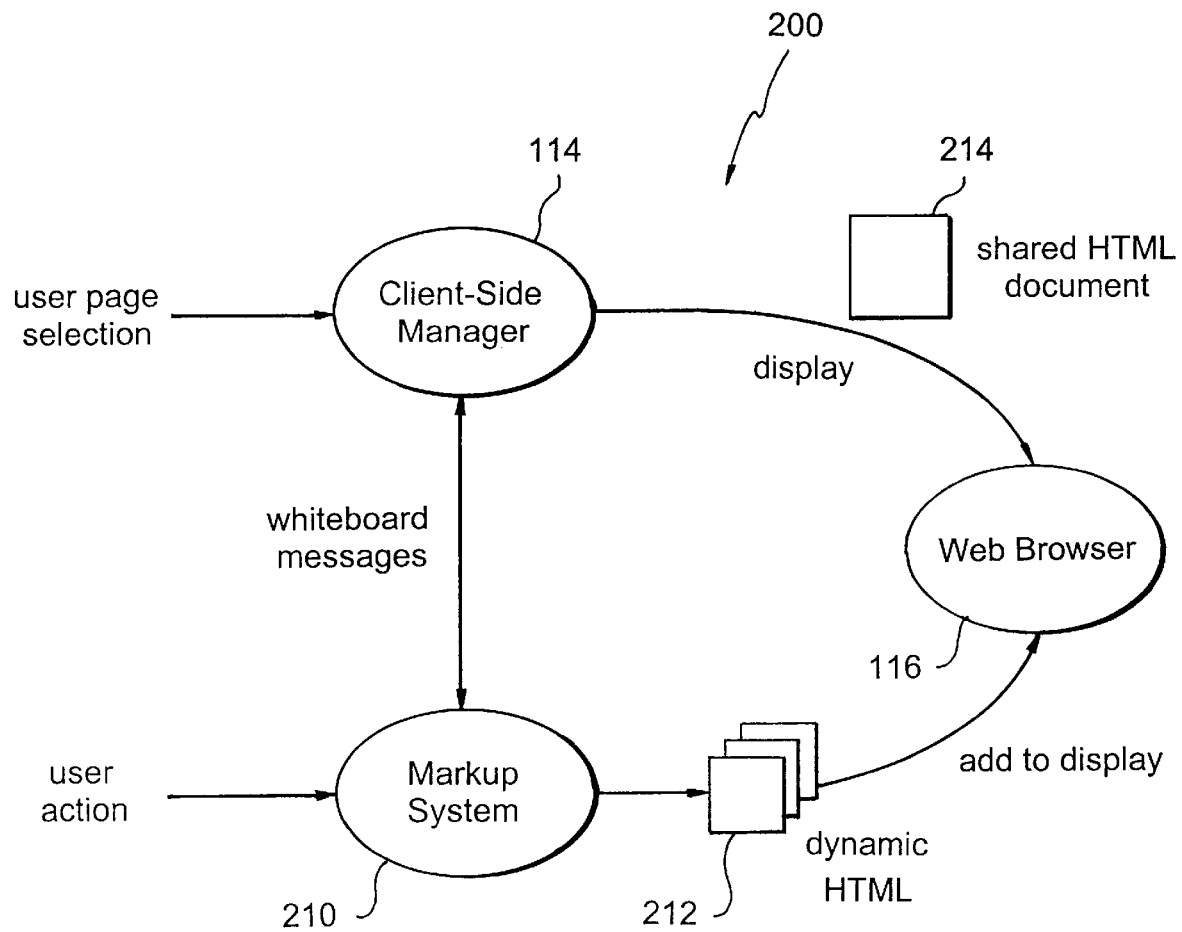
FIG. 2 is a diagram illustrating an example of interactions in the markup system of the present invention, client-side manager and Web browser.

FIG. 2 illustrates how the markup system interacts with the client-side manager and the Web browser. In the preferred embodiment, the collaboration server 112 (FIG. 1) described above, inserts a JavaScript function implementing the markup system which then is invoked inside every shared document 214 displayed by the Web browser 116. After the Web browser terminates loading and displaying the shared document it runs the JavaScript-based markup system inside the browser's virtual machine. The markup system 210 captures the user's keyboard input events or mouse clicks over particular locations of the shared document 214. When a user action event is captured the markup system 210 responds by generating HTML components 212 that are loaded and added to the document dynamically. These dynamic HTML components 212 realize the annotation elements. Depending on the floor control state, the markup events are sent to the collaboration server 112 via the client-side manager 114 to be broadcasted to all other session participants.

The collaboration server 112 is a system component which is responsible for retrieving Web-material that is referenced via URL addresses. The Web document processor, which is a component of the collaboration server, locates and modifies all HTML anchors and file references before pushing the Web page to all participants. This is the means by which the collaboration server is notified whenever a participant ventures off into the Web, and hence the new URL address is trapped, and the same process applies to the new Web-page. The collaboration server, more particularly the Web document, modifies each referenced Web page to include a reference to a markup agent, realized in the form of a client side script, as well as a reference to a style sheet, similar to the one shown in FIG. 6 to force a default style as will be explained in reference to FIG. 6. In addition, the Web document processor places the whole original document inside an HTML layer with a specific Z-position in order to support the concept of virtual planes illustrated in FIG. 3.

The collaboration server also includes a capability to accommodate late comers, or participants which join the conference after it has already started by always buffering the last pushed page to the conference participants, and pushing it to the late comer. The same technique is utilized for the markup messages. In addition to pushing the latest page, the collaboration server sends the buffered markup messages to the late comer as well. The collaboration server discards all markup messages and reclaims its buffers whenever a new page is pushed to the participants.

Figure 4:
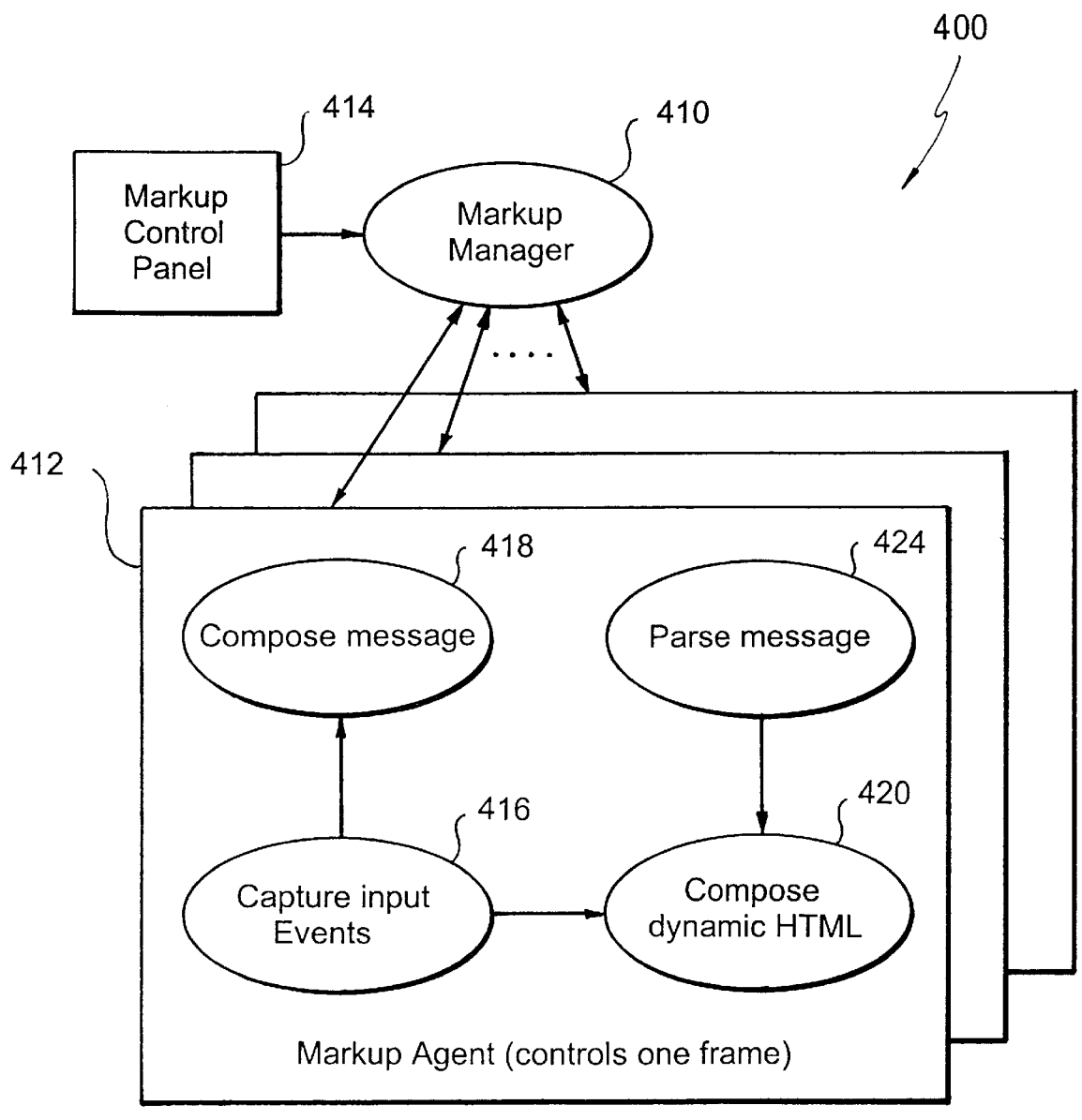
FIG. 4 illustrates various components included in the markup system of the present invention.

FIG. 4 illustrates components of the markup system 210 of FIG. 2, namely a markup manager and markup agents. The markup manager 410 implements the markup control panel 414 that is displayed to the user. This panel 414 is used to select the current mode of operation for the mouse and keyboard, i.e., pointer, text/draw, highlight, or browser mode, and other parameters such as the color and pen size. This information is available to the markup agents 412. In addition, the markup manager 414 receives from the markup agents 412 all markup events generated by the floor holder, and communicates to the collaboration server 112 via the client-side manager 114 these actions. The collaboration server 112, in turn, sends this information to all the other session participants.

Since HTML documents can be composed of multiple frames or windows, a markup agent 412 is associated with each frame. The agent has several responsibilities within its frame including:

if the user is the floor holder and is in one of the active markup modes, then all relevant mouse and keyboard input events are captured as shown at 416;

the captured input events are translated into corresponding markup actions, i.e., composition of new dynamic HTML components, shown at 420;

markup messages are composed as shown at 418, and passed to the client-side manager together with a unique identifier for the frame, in order to be transferred to other participants;

on the receiving participant's side, the received messages are parsed as shown at 424 and the corresponding markup actions are performed shown at 420.

Furthermore, to prevent the dynamically created HTML components from being lost when the user resizes the browser's window, all sent/received markup messages are archived by the sending/receiving agent. As soon as a resize event is detected, the agent replays the markup messages to refresh the annotations. The same technique is useful for saving annotated Web pages. The document source may be saved independently from the annotations, which are represented by the archived messages.

Figure 3:
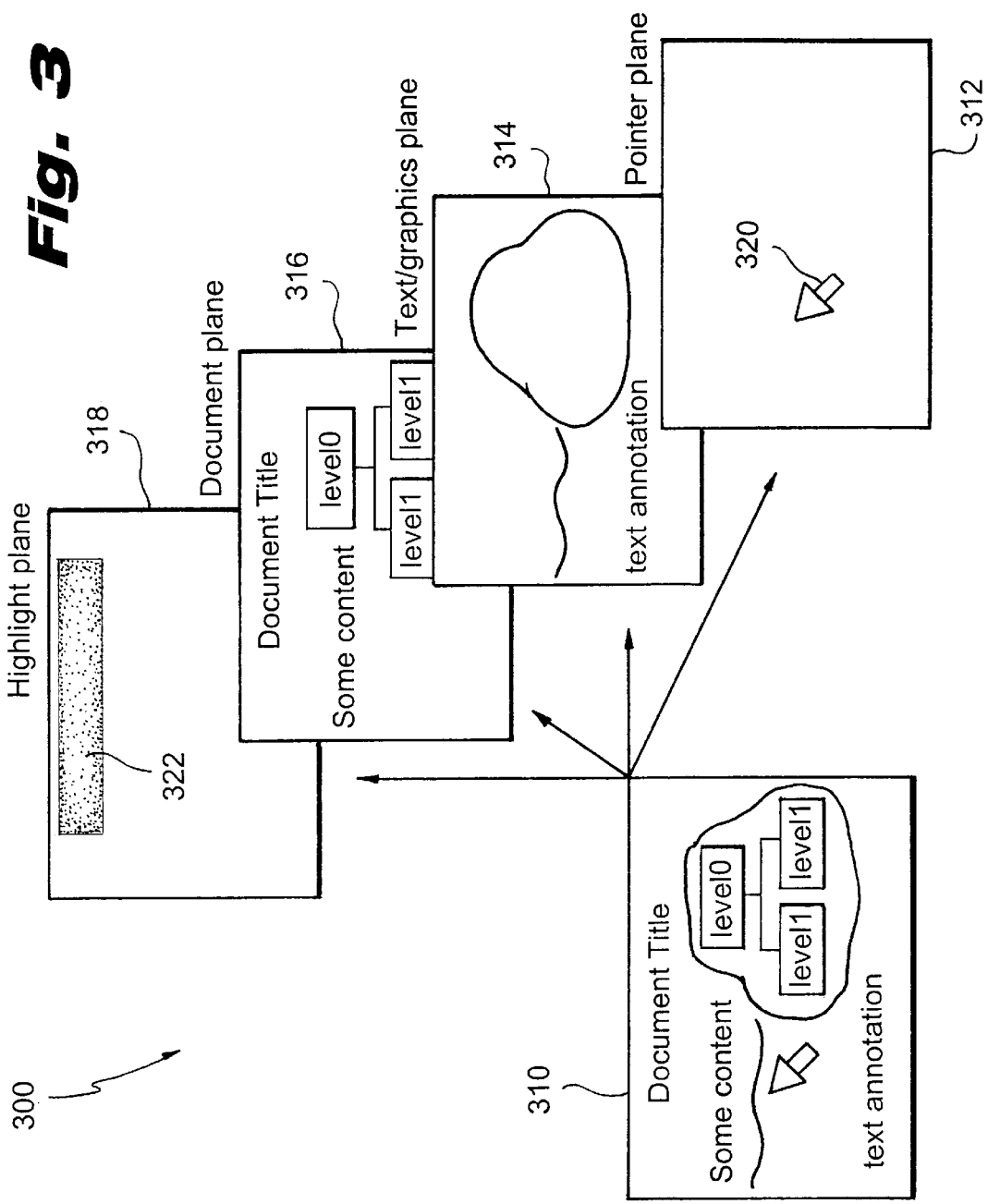
FIG. 3 is illustrates an arrangement of markup components in virtual planes as implemented in the present invention.

In the preferred embodiment, the shared document 214 (FIG. 2) as well as the dynamic HTML components 212 (FIG. 2) are arranged in virtual planes for the correct visualization of the annotated document. FIG. 3 illustrates an arrangement of markup components in virtual planes as implemented in the preferred embodiment of the present invention. As shown in FIG. 3 the annotated document is arranged according to four virtual planes, namely, the pointer plane 312, the text/draw markup plane 314, the shared document plane 316, and the highlight plane 318.

In the pointer plane 312, a virtual pointer is used by the presenter to focus the attention of the audience to a certain area of the shared document. In the text/draw plane, text and drawing annotations can be added on top of the original document. The highlight plane allows for accentuation of the areas of the document, effectively simulating use of a highlight pen on normal paper. In the preferred embodiment, each virtual plane, described in detail below, is used to implement a different markup functionality utilizing dynamic HTML.

The pointer 312 lies in the topmost virtual plane so that markup components which have been added to the shared document may be pointed to as well. The pointer 312 is implemented as an HTML layer that loads an image, i.e., the pointer image 320 in its background. The pointer image 320 may be a GIF image, conforming to the GIF89a standard, with a transparent background. An HTML layer may be regarded as a container in which other HTML components, e.g., text, images, etc., can be embedded. HTML layer may be implemented using either the LAYER tag or the DIV tag. Regardless of the HTML tag used in the implementation, the term layer is referred to herein, for describing an HTML component that acts as a container for other HTML components, and which maybe assigned a background color, and a relative position inside the browser's window.

When a presenter enters pointer mode, all mouse movement events are trapped by the markup agent 412, described above in reference to FIG. 4, and distributed to all participants. When the markup 412 agent receives the new X-Y position of the mouse, the pointer layer 312 is repositioned in the X-Y plane to follow the mouse movement. The positioning of the markup components may be achieved by using the capabilities of Cascading Style Sheets (CSS), a standard proposed by the World-Wide-Web Consortium (W3C), which introduces among other things, the ability to position HTML components using a 3-dimensional coordinate system. In the system of the present invention, virtual planes are arranged in layers by controlling the Z-position of individual layers, thus, allowing for implementing the four virtual planes described in FIG. 3.

Referring to FIG. 3, the text annotations and drawing annotation are other types of annotations which may be added to a document in the markup plane. In the preferred embodiment, the HTML layers may be used in two different ways to implement text and drawing annotations of the shared document. A text annotation is realized by a layer with a transparent background, into which the user typed input is directed, as a dynamically created HTML text paragraph. The layer 314 is positioned in the X-Y plane at the point where the user decided to add a text annotation by clicking a mouse button, using the same mechanism used for the pointer plane.

As is well known by one skilled in the art, the HTML language does not have explicit drawing commands, even at the primitive level. Moreover, client-side scripting languages do not contain graphics capabilities beyond loading full images. To overcome this limitation the system of the present invention defines its own HTML-based drawing primitive, namely the drawing pixel. In the preferred embodiment, drawing annotations are constructed using a small square layer where the square side represents the pixel's size, and its opaque background color represents the pixel's color. The X-Y position of the layer represents the drawing pixel's position inside its virtual plane. Using this drawing pixel primitive, arbitrary shapes may be easily accommodated. Furthermore, free-hand style drawing is achieved by interpolating captured mouse movement events to produce a continuous shape.

Highlighting is defined as the ability to change the background color of a portion of the document. To achieve this effect, a full original document is placed at the time of loading it, inside a layer with transparent background 316, and is positioned in the Z-dimension in a virtual plane above the highlight plane 318, as indicated in FIG. 3. When the presenter highlights a portion of the document, an opaque layer 322 is created with the required position and dimensions inside the highlight plane 318. The background color of this layer represents the highlighting color.

When a presenter makes annotations on a shared document, the annotations are captured and transmitted in a form of a communication message to other participants' markup systems running inside the shared documents displayed in the Web browsers windows of those other participants. The format of these markup system messages will now be described in detail. The messages originate at the presenter's markup agents, and are passed to the presenter's markup manager, by a direct function call. Generally, communications between markup managers and the collaboration server are carried over TCP connections. These messages are encapsulated in HTTP POST requests carrying an octet type of "application/octet-stream". This HTTP envelope is needed for crossing firewalls, and may be stripped away at the collaboration server, which echos back the messages to all markup managers participating in the session. All markup messages include a header attribute, which specifies the unique ID of the frame to which the message is directed (same ID as the originating frame ID), which enables the manager to issue a function call to the correct agent. The process of associating unique identifiers with frames will be described in detail below.

The format of the body of the messages exchanged between markup agents may be as follows:

<Request><Req_Separator><Attribute$_1$>=<Value$_1$>

<Attrib_Separator> . . .

<Attribute$_1$>=<Value$_n$><Req_Terminator>

<Req_Separator>, <Attrib_Separator>, and <Req_Terminator> are short sequences of characters which are not likely to appear in any of the Value parts, especially that of the text attribute for a Markup request. The different Request types, together with possible attributes for each type, are listed in Table 1. Any number of attributes may be associated with a request in any order, and the same attribute can appear in a request message more than once.

TABLE 1

Markup System Messages

| Request | Attribute | Value | Description |
|---|---|---|---|
| Pointer | pos | x,y | position the pointer at location (x,y) relative to the document top left corner |
| Mark | point | x,y | draw a point at location (x,y) relative to the document top left corner (interpolate if necessary) |
| | newtext | x,y | (x,y) is the top left corner of the layer that should contain subsequent text markups |
| | text | string | add string to the current text markup layer |
| | color | red \| green \| . . . | use this color in subsequent markups |
| Highlight | pos | x,y, width, height | highlight the area bounded by the rectangle whose top left corner is (x,y) with dimensions width x height |
| | color | red \| green . . . | use this color in subsequent highlights |
| Clear | target | all | clear all annotations in a frame |

TABLE 1-continued

Markup System Messages

| Request | Attribute | Value | Description |
|---|---|---|---|
| Hard Sync | resize | width, height | resize the frame window to width x height |
| | scroll | x,y | scroll the document to (x,y) offset |

A unique identifier, which is carried in the header of the message, instructs the destination manager as to which agent the message should be directed. The system of the present invention implements a method of associating unique identifiers with the corresponding frames. An HTML document may be composed of a number of frames (or windows). The Web document processor associates a markup agent 412 (FIG. 4), in the form of a client side script, with each frame. This agent handles the markup functionalities described above, within its frame. These agents generally do not have network communication capabilities. In order to send markup commands to other participants, they rely on a markup manager 410, which may typically be integrated with the client's manager applet. One instance of the manager applet, and more particularly one instance of the markup manager, runs inside each participant's browser. This applet is capable of sending markup commands back to the collaboration server 112, which in turn sends these commands to all the participants 118.

In the preferred embodiment a markup manager is the one contact point for the exchange of messages inside each browser. Therefore, it is necessary that the exchanged messages contain an identifier which identifies the target frame for the message, such that the receiving markup manager 410 knows to which markup agent 412 to direct the message. More specifically, the markup manager 410, should be able to extract enough information from the message that allows it to make a function call into the correct markup agent script. For this purpose, each markup agent 412 needs to be able to recognize the name of the frame in which it is running. As frames may be nested inside other frames, a full path name is needed for the manager to be able to call the correct function in the correct agent. The manager thus issues a function call of the form frame-reference.function-name(args), where the frame-reference is of the form top-frame.nested-frame-1.

nested-frame-2 . . . nested-frame-n. The recursive JavaScript routine shown in FIG. 5 is executed once by each markup agent 412 at initialization time to identify its frame's full path name within the browser's window. The routine 500 utilizes the frames[ ] array which is a JavaScript property associated with each frame, and contains references to child frames of a given frame. A depth-first search is performed starting from the top level frame. At the end of execution of this routine, a second level nested frame may have a name like top.frames[1].frames[0], if it happens to be the first frame nested inside the second frame in the top level window.

In cases where multiple windows are opened by the Web browser, a window reference is needed in addition to the frame reference within the window. In such cases, the sending markup agent adds the window name to the message. The receiver markup manager may get a reference to the window knowing its name by attempting to reopen the window using the JavaScript open command. If the window exists, which usually is, the case JavaScript returns a reference to the existing window. Appending the frame reference and function name to the window reference allows the manager to direct the received message to the appropriate agent. It should be noted that even though window names are mandatory, not optional as in the case of frame names, a null or empty string name is allowed in which case, a Web document processor must intervene and add a dummy name for the opened window. The initial browser window may be assumed to be the default window if no window name is found in the message.

On the other hand, the sending agent, running in an opened window, needs to be able to reference the initial browser window inside which the markup manager is running to pass on markup commands to the manager to be communicated to the other participants. To do so, the agent uses the JavaScript opener property of the window which gives a reference to the window which opened the current window. This property may be recursively used until the initial browser window containing the markup manager is reached.

An important problem that arises when employing a markup system for marking-up a shared HTML document is the need to exercise control over the browser's environment to some extent. Differences in screen resolutions, window sizes, font sizes, scrolling offsets, etc. result in different layouts of HTML contents. However, input events generated by mouse button clicks and movements are given in X-Y coordinates. Composing HTML components and adding them at these coordinates will produce the desired markup effects on the presenter's browser only, and will produce arbitrary effects on other participants' browsers. The result being a presenter's mark surrounding one segment of the document appearing to another participant as a mark surrounding another segment of the document.

Attempting to understand which components of the document are being annotated, and to replicate the operation on every participant's browser based on the particular setup of that browser is a complex process. In this approach, for example, the result of circling a text statement presented in one line on one browser, may be circling two lines on another browser because the second user has chosen a bigger font size or a smaller browser window width which caused the browser to layout the statement over two lines. An efficient implementation of this approach requires knowledge of the browser's algorithm for rendering HTML components.

The system of the present invention synchronizes the views of all the participants to a single replicated consistent view. This allows for safely positioning dynamic HTML components on the participants' browsers based on their corresponding X-Y positions on the presenter's browser. In the present invention, two embodiments for synchronizing the views of the participants of a Web-based collaborative session, and presenting a consistent view of the shared document and its annotations to the participants are presented. Each method has its relative merits, and may be more suitable for a particular application domain. Common to both methods is the need for using a Cascading Style Sheet (CSS) for fixing basic appearance parameters such as font sizes and typefaces.

Environment parameters such as font sizes, font typefaces, margin widths, and any other similar parameters that may affect the appearance of the HTML document, and may depend on user preferences or browser defaults, are collectively referred to as the style of the document. The system of the present invention, for example, may use the W3C's Cascading Style Sheets proposed standard to force all such parameters to a constant setup during the session. A persistent style sheet which contains a style setup that overrides the user preferences and browser defaults which are defined in default or alternate style sheets, is associated with the presented document. FIG. 6 shows a sample style sheet that sets the default font size and style for the HTML tag. All tags embedded inside the HTML tag inherit the same font properties except those tags whose font properties are explicitly specified in the style sheet, e.g., H1 tags.

In one embodiment, a fully synchronized WYSIWIS environment is achieved by controlling a big number of the environment parameters, and keeping these parameters in a consistent state. This is achieved by either fixing the values of certain parameters to some constant values for all the session participants, or by forcing all the participants' browsers to follow the corresponding parameters on the presenter's browser: if the presenter alters one of these parameters, the action is captured, and a message is sent to all the participants forcing a corresponding change in the parameter. These controlled parameters include the following list.

Window (Frame) size: The window or frame size, particularly its width, is an important factor that affects the layout of the HTML document by the Web browser. Also, it determines, together with the scrolling offset, the visible portion of the document which may be very useful to control in some application domains. For example, in an educational application, the teacher may want to hide the solution to a problem for a while and show it later on after a brief discussion with the students.

To control the frame size parameter, the client-side script is made to capture all attempts to resize the frame. If the presenter attempts to resize the frame, the operation is allowed and replicated for all the other participants. If a participant other than the presenter attempts to do the resize operation, the operation is denied.

Scrolling offset: This parameter together with the window (frame) size parameter control the visible portion of the document. These two parameters play a vital role in effecting a WYSIWIS environment.

The scrolling offset is controlled in a way similar to the way described above for controlling the frame size. In this embodiment, the scrolling event is captured by periodic polling of the scrolling offset as opposed to event capturing, due to a limitation in the scripting language.

Style: Using a style sheet (CSS) as described above.

In another embodiment for synchronization of views, a minimal subset of the environment parameters whose control is necessary for effective marking-up of shared HTML documents are identified. Only these parameters are controlled. The net effect is consistent annotations without necessarily hard synchronization of views. In this embodiment, users are free to resize their windows, or scroll to any possible offset in the document. The controlled environment parameters in this embodiment include the following listed.

Style: Using a style sheet as in the hard synchronization method.

Document width: As mentioned earlier, the width of the document, which is normally defined by the width of the frame containing it, is a major factor in determining the document's layout. In this embodiment, the document's width is controlled by placing the whole original document inside a layer with a specific fixed width. This width is set to the same value for all participants, while the window sizes and scrolling offsets are left free for each participant to control. In this way, each participant has full control over the visible portion of the document on her machine, without affecting the layout of the document.

This embodiment is complemented by an intelligent viewing mechanism, which attempts to show the center of attention, or the area of the document that is being actively annotated, highlighted, or pointed at. Then participants may move away from this area, as they have full control over the visible area of the document.

While the invention has been particularly shown and described with respect to a preferred embodiment thereof, it will be understood by those skilled in the art that the foregoing and other changes in form and details may be made therein without departing from the spirit and scope of the invention. For example, an alternative embodiment the markup system having more than one markup manager in a Web browser may be featured.

Having thus described our invention, what we claim as new, and desire to secure by Letters Patent is:

1. A Web-based collaboration system for enabling one or more group participants to annotate a shared hyper-text document utilizing conventional Web browsers, the system comprising:
   a markup system executing inside a conventional Web browser's virtual machine of each of the one or more group participants;
   the markup system including a mechanism for capturing markup events associated with annotations applied to the shared hyper-text document by a group participant, a mechanism for transmitting to other of the one or more group participants the captured markup events, a mechanism for receiving from the other of the one or more group participants markup events associated with annotations applied to the shared hyper-text document, a mechanism for generating corresponding dynamic hyper-text components in response to the markup events captured or received and a mechanism for adding the dynamic hyper-text components generated in response to the markup events captured or received to the shared hyper-text document,
   wherein the annotations are presented directly on the shared hyper-text document by the conventional Web browsers of the one or more group participants.

2. The Web-based collaboration system as claimed in claim 1, wherein the system further comprises a collaboration server for modifying the shared hyper-text document to insert the markup system into the shared hyper-text document, and wherein the markup system is invoked inside the shared hyper-text document when the shared hyper-text document is displayed by each group participant's Web browser.

3. The Web-based collaboration system as claimed in claim 2, wherein the markup system further transmits the markup events to the collaboration server, the collaboration server further broadcasting the markup events to the other of the one or more group participants in a Web collaboration session, thereby enabling the one or more group participants to view the shared hyper-text document with the annotations directly on the shared hyper-text document.

4. The Web-based collaboration system as claimed in claim 3, wherein the markup system further receives the markup events from the collaboration server and generates corresponding dynamic hyper-text components associated with the received markup events for presentation directly on the shared hyper-text document.

5. The Web-based collaboration system as claimed in claim 2, wherein the collaboration server is distributed and is resident with the Web browser.

6. The Web-based collaboration system as claimed in claim 2, wherein the collaboration server is centralized and is located remotely from the Web browser.

7. The Web-based collaboration system as claimed in claim 3, wherein the markup system comprises:
   a markup agent associated with a frame within the shared hyper-text document, the markup agent responsible for capturing markup events within the frame and composing corresponding dynamic hyper-text components for overlaying directly on the shared hyper-text document, the markup agent further generating messages corresponding to the markup events to be communicated to the one or more group participants; and
   a markup manager for receiving the messages from the markup agent and identifying the frame corresponding to the markup agent,
   wherein the markup manager communicates the messages including a frame identity associated with the markup agent to the collaboration server for broadcasting to the one or more group participants.

8. The Web-based collaboration system as claimed in claim 7, wherein the markup manager further includes a mechanism for receiving markup event messages from the collaboration server, the collaboration server having received the messages from remote Web browsers of the one or more group participants in the Web collaboration system, and communicating the messages to markup agents associated with frames identified in the messages, wherein the markup agents parse the messages and generate corresponding dynamic hyper-text components for overlaying on the shared hyper-text document.

9. The Web-based collaboration system as claimed in claim 7, wherein the markup agent further identifies the frame in which the markup agent is running by employing a recursive depth first search and includes the frame identity with the message generated in response to the markup events.

10. The Web-based collaboration system as claimed in claim 3, wherein the collaboration server pushes the shared hyper-text document with the group participant annotations to the one or more group participants.

11. The Web-based collaboration system as claimed in claim 3, wherein the collaboration server delivers to Web browsers associated with the other of the one or more group participants a location reference of the shared hyper-text document including the group participant annotations, wherein the Web browsers retrieve the shared hyper-text document including the group participant annotations and present the same to the one or more group participants.

12. The Web-based collaboration system as claimed in claim 3, wherein the system further comprises a mechanism for synchronizing views of the shared hyper-text document and the annotations presented directly on the shared hyper-text document by the Web browsers of the one or more group participants during the Web collaboration session, wherein the mechanism for synchronizing views sets corresponding environment parameter values equal in all Web browsers participating in the Web collaboration session.

13. The Web-based collaboration system as claimed in claim 3, wherein the system further comprises a mechanism for synchronizing views of the shared hyper-text document and the annotations presented directly on the shared hyper-text document by the Web browsers of the one or more group participants during the Web collaboration session, wherein the mechanism for synchronizing views controls a subset of environment parameters associated with an active portion of the shared hyper-text document displayed.

14. The Web-based collaboration system as in claimed in claim 3, wherein the collaboration server further buffers a latest shared hyper-text document displayed during the Web collaboration session, and wherein the collaboration server pushes the latest shared hyper-text document to a new participant's Web browser.

15. The Web-based collaboration system as claimed in claim 1, wherein the markup system is implemented with platform-independent enhanced markup language and scripting language.

16. The Web-based collaboration system as claimed in claim 1, wherein the shared hyper-text document includes hyper-text markup language (HTML) document.

17. The Web-based collaboration system as claimed in claim 1, wherein the system further comprises virtual planes into which the shared hyper-text document and the dynamic hyper-text components are arranged.

18. The Web-based collaboration system as claimed in claim 17, wherein the virtual planes comprise a pointer plane for loading pointer image and its movements in response to the markup events.

19. The Web-based collaboration system as claimed in claim 17, wherein the virtual planes further comprise a text and graphics markup plane for enabling the a group participant to annotate with text and graphics images.

20. The Web-based collaboration system as claimed in claim 19, wherein the system further includes a hyper-text markup language-based drawing primitive, the drawing primitive including one or more layers, each of the one or more layers representing a pixel, wherein drawing annotations of arbitrary shapes are enabled on the text and graphics markup plane.

21. The Web-based collaboration system as claimed in claim 20, wherein each of the one or more layers further includes an opaque background color for representing a pixel color.

22. The Web-based collaboration system as claimed in claim 20, wherein the system further supports a free-hand style drawing on the markup plane by interpolating position data between positions of captured mouse movement event to produce continuous shapes.

23. The Web-based collaboration system as claimed in claim 17, wherein the virtual planes further comprise a shared document plane for loading the shared hyper-text document.

24. The Web-based collaboration system as claimed in claim 17, wherein the virtual planes further comprise a highlight plane for enabling a group participant to highlight a portion of the shared hyper-text document, wherein the markup system creates an opaque layer in the highlight plane on a location overlapping the portion of the shared hyper-text document highlighted by the [user] group participant.

25. In a Web-based collaboration system, a method for enabling one or more group participants to annotate a shared hyper-text document utilizing conventional Web browsers, the method comprising:
    invoking a markup system inside a conventional Web browser's virtual machine of each of the one or more group participants;
    capturing via the markup system markup events associated with annotations applied to the shared hyper-text document by a group participant and transmitting via the markup system to other of the one or more group participants the captured markup events;
    receiving from the group participant at the Web browsers of the other of the one or more group participants via the markup system markup events associated with annotations applied to the shared hyper-text document;
    generating via the markup system of the one or more group participants Web browsers corresponding hyper-text components in response to the markup events captured or received;
    dynamically adding via the markup system of the one or more group participants Web browsers the hyper-text components generated in response to the markup events captured or received to the shared hyper-text document,
    wherein the annotations are presented directly on the shared hyper-text document by the conventional Web browsers of the one or more group participants.

26. The method according to claim 25, wherein the method further comprises:
    buffering a latest shared hyper-text document displayed during a Web collaboration session; and
    pushing the latest shared hyper-text document to a new participant's Web browser.

27. The method according to claim 25, further comprising the steps of:
    archiving the generated hyper-text components; and
    dynamically redisplaying the generated hyper-text components in response to detecting a resize event in the Web browser.

28. The method according to claim 25, further comprising a step of:
    synchronizing views of the shared hyper-text document and the annotations presented directly on the shared hyper-text document by the Web browsers of the one or more group participants during a web collaboration session by controlling environment parameters of the Web browsers associated with the one or more group participants.

29. The method according to claim 28, wherein the step of synchronizing includes equalizing corresponding environment parameters utilized by the Web browsers of the one or more group participants.

30. The method according to claim 28, wherein the step of synchronizing includes controlling environment parameters associated with active portions of a view displaying the shared hyper-text document.

31. The method according to claim 25, further comprising a step of:
    providing virtual planes that overlap the shared hyper-text document into which the one or more group participants may enter annotations.

32. The method according to claim 31, wherein the step of providing virtual planes includes providing a pointer plane for loading pointer image and tracking its movements in response to the markup events.

33. The method according to claim 31, wherein the step of providing virtual planes includes providing a text and graphics markup plane for capturing text and graphics image annotations including free-hand style drawing annotations.

34. The method according to claim 33, wherein the step of providing the text and graphics markup plane includes:
    constructing one or more layers for representing pixels,
    wherein drawing of arbitrary shapes is enabled on the markup plane.

35. The method according to claim 34, wherein the step of providing the text and graphics markup plane further includes:
    supplying an opaque background color for each of the one or more layers for representing a pixel color.

36. The method according to claim 34, wherein the step of providing the text and graphics markup plane further includes:

capturing mouse movement events;

interpolating data between positions of the captured mouse movements events; and producing a continuous shape from the interpolated data, wherein the system is enabled to support the free-hand style drawing annotations.

37. The method according to claim 31, wherein the step of providing virtual planes includes:

providing a highlight plane for enabling the a group participant to highlight the shared hyper-text document; and creating an opaque layer in the highlight plane on a location overlapping the portion of the shared hyper-text documented where the group participant highlighted.

38. The method according to claim 31, wherein the step of providing virtual planes includes:

providing a shared document plane for loading the shared hyper-text document.

* * * * *